July 8, 1958
V. N. JARRELL
2,842,255
VINE FEEDING MACHINE
Filed Aug. 22, 1955
4 Sheets-Sheet 1
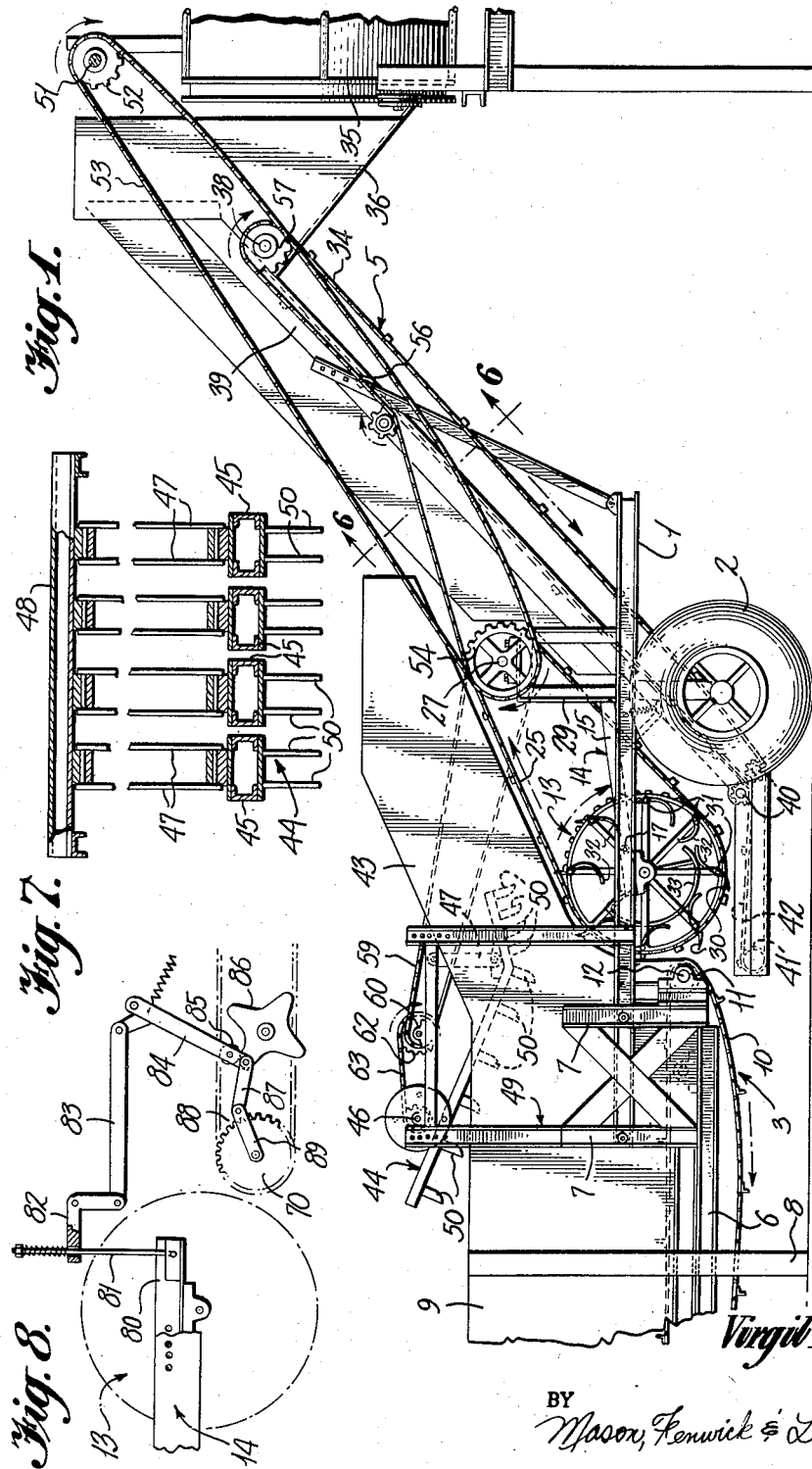
INVENTOR
*Virgil N. Jarrell*
BY *Mason, Fenwick & Lawrence*
ATTORNEYS

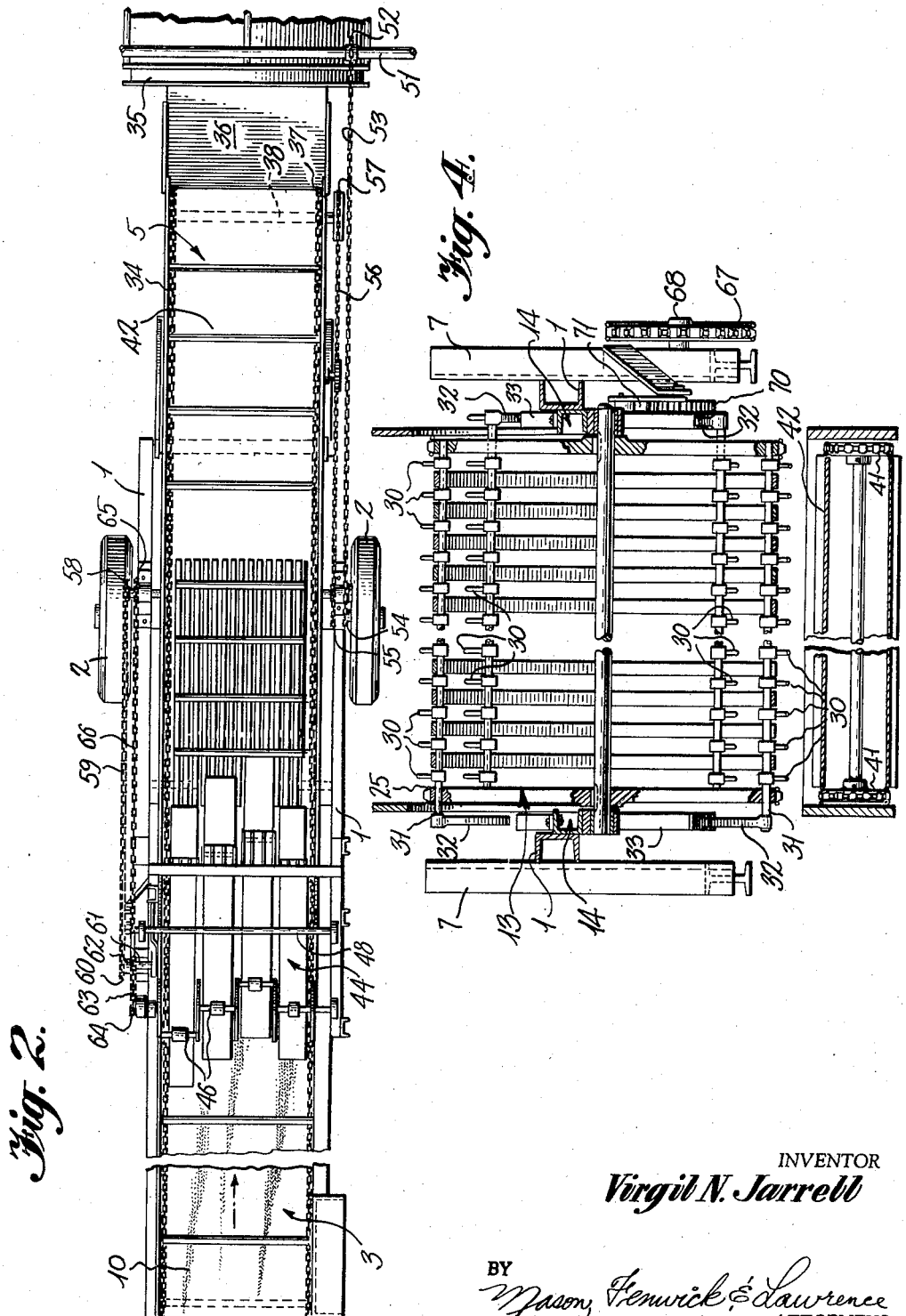

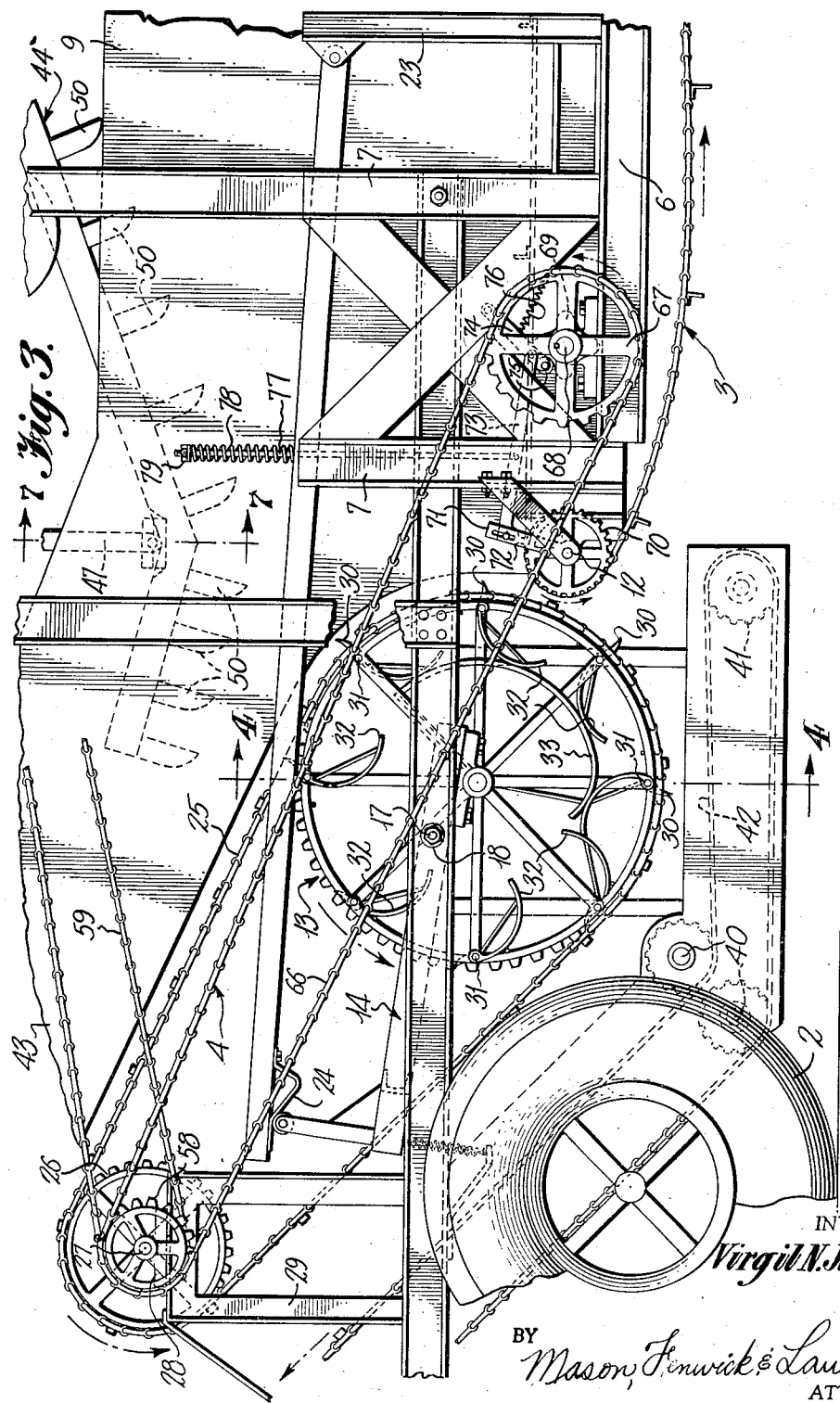

July 8, 1958
V. N. JARRELL
2,842,255
VINE FEEDING MACHINE
Filed Aug. 22, 1955
4 Sheets-Sheet 4
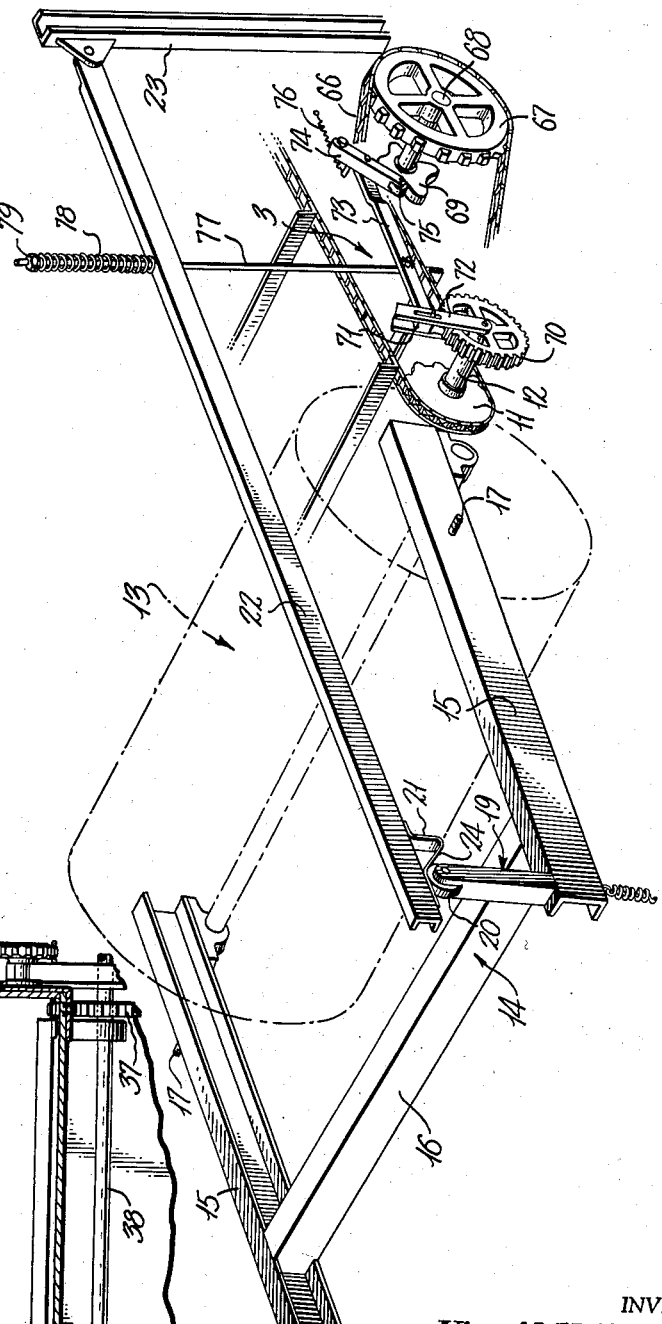
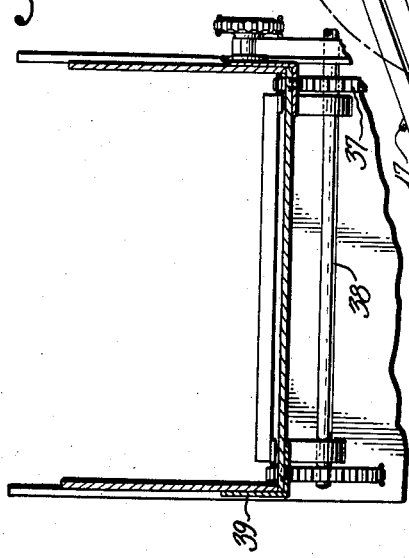
INVENTOR
*Virgil N. Jarrell*
BY
*Mason, Fenwick & Lawrence*
ATTORNEYS

United States Patent Office 2,842,255
Patented July 8, 1958

2,842,255

VINE FEEDING MACHINE

Virgil N. Jarrell, Viola, Del.

Application August 22, 1955, Serial No. 529,637

13 Claims. (Cl. 198—37)

This invention relates to improved machines for feeding vines to so-called viners for removing the produce from the vines.

Although viners have come into common usage, there has been difficulty in getting the utmost efficiency and yield from them due to inability to feed the vines uniformly in desired quantity. If the vines are fed too slowly the peak efficiency of the machine is not used, and if they are fed too rapidly the viner is unable to strip all produce from the vines and the percentage of yield is lowered.

The object of the present invention is to provide a viner feeder which will feed vines from a source of supply and automatically control the rate of feed to deliver a continuous supply to the viner at a uniform rate.

A more specific object is the provision of such a device having automatic means to regulate the movement of the input feed in to a constant delivery feed in accordance with the mass of material carried by the input feed to assure a constant delivery rate.

Another object is to provide a machine of this kind having means to arrange the material to approximate uniform depth for uniform delivery to the viner.

Other objects of the invention will become apparent from the following description of one practical embodiment thereof, when taken in conjunction with the drawings which accompany, and form part of, this specification.

In the drawings:

Figure 1 is a side elevation of a feeding mechanism embodying the principles of the present invention, shown in operative position adjacent a viner;

Figure 2 is a top plan view of the feeder;

Figure 3 is an enlarged longitudinal section through only the central part of the machine, illustrating the automatic control mechanism;

Figure 4 is a vertical transverse section through the feeder drum and delivery conveyor mechanism, taken on the line 4—4 of Figure 3;

Figure 5 is a perspective view of the input feed conveyor drive and the drive control mechanism including the feeder drum;

Figure 6 is a section taken on the line 6—6 of Figure 1;

Figure 7 is a section through the walker mechanism, taken on the line 7—7 of Figure 3; and Figure 8 is a side view of a slightly modified input feed drive and control mechanism.

In general, the invention consists of a viner feeder which has means for feeding vines from a source of supply, with control mechanism for varying the input feed drive rate in accordance with the input load to assure a uniform delivery rate by a constant speed delivery feed. Means are also included to distribute the load over a transfer belt so that it will be received and delivered by the delivery belt at a uniform rate.

Referring to the drawings in detail, the machine is illustrated as having a main frame 1, or chassis, mounted upon wheels 2 so that the machine may be transported from place to place. On the frame are supported an input feed mechanism 3, a transfer and feed control mechanism 4, and a delivery mechanism 5.

The input feed is mounted on a secondary frame 6, which is to the front of and below the main frame. Frame 6 is suspended by vertical channels 7 from the main frame, and may be supported by legs 8 when the machine is set for use. The front of the input feed is formed as a hopper 9 to receive a supply of vines to be fed to the viner. The bottom of the hopper and, in fact, the floor of the entire input feed is formed by the top flight of an endless conveyor 10. Conveyor 10 is mounted on sprockets 11 on shafts 12 journalled in the frame 6. The drive for the conveyor will be described later.

The transfer and control mechanism 4 consists principally of a feed drum 13 rotatably mounted in a floating frame 14. Frame 14 is made up from a pair of side bars 15, connected by a beam 16 extending between the bars. Each bar carries a trunnion 17 which fits in a bearing 18 in the main frame 1 to pivotally mount the frame. The feed drum is journalled in the side bars 15 near one end. The pivot for the floating frame 14 is positioned rather close to the feed drum so that, to some extent, the rearwardly projecting end of the frame will counterbalance the drum. When the frame is mounted, the periphery of the drum is near the input conveyor as it turns about the sprockets 11. The rear end of the frame 14 at one side carries an upright member 19, having a roller 20 at its top end to ride against a wear plate 21 fastened to the underside of a lever 22, pivoted at its forward end to a post 23 fixed to the secondary frame 6. Thus, the weight of the lever 21 is added to that of the floating frame 14 to counterbalance the feed drum and its load to hold the frame and drum in operative position, substantially as shown in Figure 3. Wear plate 21 has a cam surface 24 which declines forwardly, so that upward and forward movement of the roller 20, as the frame 14 rocks clockwise, as viewed in Figure 3, about its pivots, will swing the lever upwardly about its fulcrum. This movement controls the feeding action of conveyor 10.

An endless slat conveyor 25 passes around the feed drum and sprockets 26 mounted on a shaft 27 journalled in bearings 28 mounted on seats 29 fastened to the main frame 1. Vines 12 will be carried by the upper flight of the conveyor 25 from the feed conveyor 10 to the delivery mechanism.

In order to pick up vines from the feed conveyor 10, the feed drum is provided with a plurality of pick up fingers 30. A number of shaft 31 are mounted near the periphery of the drum, the shafts being equally spaced around the drum and each carrying a plurality of spaced fingers 30. The shafts are pivoted in the end members of the drum and have operating arms 32 fixed to their ends, outside the drum. As the finger mountings are rotatable the fingers are free to rock and slide out of the vines as the conveyor 25 leaves the drum in its upward travel. To hold the fingers rigid while engaging the vines and carrying them to the upper flight of the conveyor, cam tracks 33 are provided to engage the operating arms 32 before the fingers reach vine-engaging position and hold them until their arc of operating travel is completed. The cam tracks are mounted on the main frame 1.

Conveyor 25, as it turns about sprockets 26, dumps onto a delivery conveyor 34. This conveyor is inclined at a rather steep angle to carry vines from the transfer conveyor to the viner. A portion of the viner is shown at 35, and the chute 36 permits the vines to slide down into the viner mechanism. Conveyor 34 is mounted at the top on sprockets 37 on shaft 38 journalled in frame members 39 supported at the rear of main frame 1. Beneath the transfer mechanism, conveyor 34 passes around idler sprockets 40 and forward to form a horizontal flight. A sprocket 41, beneath the feed conveyor, forms the end sprocket for conveyor 34. The horizontal flight 42 of this conveyor extends across the gap between the feed and transfer conveyors and will catch any vines that may fall and carry them to the viner.

In order to prevent vines from dropping off the edges of the various conveyors, the machine may be equipped with side plates 43.

Above the feed drum, leveling mechanism 44 is mounted to hold the depth of vines on conveyor 25 to predetermined thickness and to evenly distribute the vines. The mechanism consists of a plurality of walkers 45, mounted near one end on a crank 46. Four walkers are shown, each mounted on one throw of the crank, with the crank throws displaced ninety degrees from one another. Near their rear ends, the walkers are pivotally connected to links 47, which have their upper ends pivotally mounted on a shaft 48 fixed upon standards 49 rising from the main frame. The standards also support the crank. Rotation of the crank will cause the walkers to move backwardly and forwardly with a swinging motion. Teeth 50 projecting downwardly from the walkers will engage vines on conveyor 25 above a predetermined level and push them about to level off the mass.

All of the moving parts of the machine are driven from the viner. A power shaft of the viner, indicated at 51, is fitted with a sprocket 52, and a chain 53 passes around this sprocket and a drive sprocket 54 on the shaft 27 of the transfer mechanism. This will furnish power to the transfer mechanism. Another sprocket 55 on shaft 27 carries a chain 56 which drives conveyor 34 through sprocket 57 in shaft 38. Still another sprocket 58 on shaft 27 drives crank 46 through chain 59 to sprocket 60 on stub shaft 61 and sprocket 62 on shaft 61, chain 63 and sprocket 64 on the crank shaft.

A fourth sprocket 65 on shaft 27 drives a chain 66 which passes around a sprocket 67 on a shaft 68 mounted on the supplemental frame 6. Shaft 68 carries a star wheel 69 which, through chain drive 66, will be rotated continuously while the machine is in operation. A ratchet 70 is fixed to the feed conveyor shaft 12, and the shaft is rotated step by step by a pawl 71 carried by an arm 72 freely mounted on the shaft 12. Arm 72 is rocked by means of a link 73 pivotally connected to arm 72 and a rocker arm 74 which is pivoted to a convenient part of the frame 6. The rocker arm has a roller 75 at its free end adapted to follow the surface of the star wheel. Spring 76 holds roller 75 against the star wheel and retracts the arm after it leaves a tooth of the wheel. Thus, rotation of the star wheel will cause oscillation of the rocker arm and step by step movement of the feed conveyor.

To control the speed of feeding movement of the conveyor 10, the lever 22 is connected to the link 73. The connection is by means of a rod 77 which is secured to link 73 and is slidable through lever 22. A spring 78 about the rod above the lever keeps the rod in proper tension and will yield under strain to prevent breakage of the rod or the feed conveyor operating linkage. An adjusting nut 79 permits changing the tension of spring 78 to suit varying conditions.

When vines are dumped into the hopper 9, the feed chain will draw them from the bottom and carry them to the feed drum. Fingers 30 will pick up the vines from the conveyor 10 and carry them upward to be transported to the delivery mechanism by the transfer chain. As mentioned above, the drum and its normal load are counterbalanced by the floating frame 14 and the lever 22. If a large mass of vines is fed to the drum, the extra weight will cause the drum to move down swinging frame 14 around its pivots and lifting lever 22. When the lever rises, rod 77 is lifted, and link 73 will be raised causing rocker arm 74 to swing outward and roller 75 to move away from the center of the star wheel. As the roller is moved away from the center of the star wheel the points of the star wheel will have less effect upon the rocker arm and less movement will be imparted to the feed conveyor. If the roller is lifted beyond the outer orbit of the star wheel points, there will be no movement of the feed conveyor. As soon as the excess weight has been moved on by the transfer conveyor, the drum will rise to its normal position and the feed will restart. As the excess material passes over the drum the walkers will distribute it so that the layer on the transfer conveyor, and consequently that on the delivery conveyor, will be uniform at all times.

The present machine will automatically control the feed of the vines so that the delivery to the viner will be consistent.

In Figure 8 there is shown a modified form of feed conveyor drive and control mechanism. Here, the lever 22 is omitted, and the floating frame 14 has a forward extension 80 which is connected by a rod 81 to the end of one arm of a bell crank 82, pivotally connected to some convenient part of the frame. The other arm of the bell crank is connected to a link 83 which, in turn, is pivotally attached to the rocker arm 84. The rocker arm carries a roller 85 for coaction with the star wheel 86 to move link 87 and advance and retract pawl 88 mounted on lever 89. It will be obvious that rotation of the star wheel will cause step by step movement of the feed conveyor, and that downward movement of the feed drum will move the roller 85 away from the center of the star wheel to reduce or stop the feeding movement of the feed conveyor.

While in the above one practical embodiment of the invention has been disclosed, it will be understood that the details of construction shown and described are merely by way of illustration and the invention may take other forms within the scope of the appended claims.

What is claimed is:

1. In a vine feeding machine, a frame, input and delivery conveyors mounted on said frame, a transfer conveyor intermediate said input and delivery conveyors to receive vines thereon from said input conveyor and deposit them on said delivery conveyor, said transfer conveyor having a floating mount on said frame and being biased to support a predetermined weight load and movable downwardly under loads in excess of the predetermined amount, means to drive said transfer and delivery conveyors, means to move said input conveyor, and means operative by movement of the transfer conveyor under weight load variations to control said input conveyor moving means.

2. In a vine feeding machine, a frame, input and delivery conveyors mounted on said frame, a transfer conveyor intermediate said input and delivery conveyors to receive vines from said input conveyor and deposit them on said delivery conveyor, said transfer conveyor having a floating mount on said frame, means to drive said input, transfer and delivery conveyors, and means interconnecting said transfer conveyor and the drive means for said input conveyor operable in response to floating movement of said transfer conveyor under load to control the movement of said input conveyor, said transfer conveyor including a feed drum around which said transfer conveyor passes, a plurality of fingers pivotally mounted at spaced points around said drum, and means to project and hold said fingers beyond the periphery of said drum for a predetermined arc of travel of said drum.

3. In a vine feeding machine as claimed in claim 1, a hopper to receive a supply of vines, said input conveyor having an upper flight extending adjacent the bottom of said hopper to transport vines from said hopper.

4. In a vine feeding machine, a frame, input and delivery conveyors mounted on said frame, a transfer conveyor intermediate said input and delivery conveyors to receive vines from said input conveyor and deposit them on said delivery conveyor, said transfer conveyor having a floating mount on said frame, means to drive said input, transfer and delivery conveyors, and means interconnecting said transfer conveyor and the drive means for said input conveyor operable in response to floating movement of said transfer conveyor under load to control the movement of said input conveyor, said means to drive said input conveyor including a drive shaft for said input conveyor, a ratchet on said shaft and a pawl movable relative to said ratchet, a driven star wheel, a rocker arm having an end engageable by the points of said star wheel to rock said arm, and means conecting said rocker arm and pawl to transmit motion of said rocker arm to said pawl.

5. In a vine feeding machine as claimed in claim 4, said means to control the movement of said input conveyor including a pivoted lever having its free end in contact with the floating transfer conveyor, and means interconnecting said lever and said rocker arm when said lever is moved.

6. In a vine feeding machine as claimed in claim 1, leveling means above said transfer conveyor to distribute vines accumulated on said transfer conveyor above a predetermined depth.

7. In a vine feeding machine as claimed in claim 6, said leveling means including a plurality of toothed walkers, and means to oscillate said walkers in alteration.

8. In a vine feeding machine as claimed in claim 1, said means to control said input conveyor moving means including means to vary the speed of said input conveyor.

9. In a vine feeding machine, a main frame, input and delivery conveyors mounted on said frame, a transfer conveyor intermediate said input and delivery conveyors to receive vines from said input conveyor and deposit them on said delivery conveyor, said transfer conveyor including sprockets, a feed drum and an endless belt about said sprockets and feed drum, a floating frame pivotally connected intermediate its ends to said main frame and having said feed drum mounted at one end thereof, means to drive said delivery, and transfer conveyors, a drive shaft for said input conveyor, a ratchet fixed to said drive shaft, a pawl for cooperation with said ratchet and mounted for bodily movement peripherally of said ratchet, a driven star wheel, a rocker arm having one end to be contracted by the points of said wheel to rock said arm, means connecting said rocker arm and pawl to transmit movement of said rocker arm to said pawl, and means connected to said rocker arm and operable by tilting movement of said floating frame to move the end of said rocker arm contacted by said star wheel toward and from the center of said star wheel.

10. In a vine feeding machine as claimed in claim 9, said feed drum having a plurality of fingers pivotally mounted at spaced points around the drum, and means to project and hold said fingers beyond the periphery of said drum over a predetermined arc of travel of said drum.

11. In a vine feeding machine as claimed in claim 9, leveling means above said transfer conveyor to distribute vines accumulated on said transfer conveyor above a predetermined depth.

12. In a vine feeding machine as claimed in claim 11, said leveling means including a plurality of toothed walkers, and means to oscillate said walkers in stepped phase.

13. In a vine feeding machine as claimed in claim 9, said main frame being wheeled to permit transportation of said machine.

References Cited in the file of this patent
UNITED STATES PATENTS

| | | |
|---|---|---|
| 1,033,901 | Jensen | July 30, 1912 |
| 1,232,405 | Stark | July 3, 1917 |
| 2,538,914 | Rosenthal | Jan. 23, 1951 |
| 2,606,559 | Maus | Aug. 12, 1952 |